United States Patent [19]

Hoff

[11] 4,411,482
[45] Oct. 25, 1983

[54] TELEPHONE ORGANIZER

[76] Inventor: Nikolaus Hoff, 31 Howbert Dr., Weston, Ontario, Canada

[21] Appl. No.: 245,657

[22] Filed: Mar. 20, 1981

[51] Int. Cl.³ ..................... H04M 1/02; A47B 63/00
[52] U.S. Cl. .................................. 312/233; 312/231; 312/242; 179/178
[58] Field of Search ............... 312/231, 233, 232, 244, 312/320, 243, 242, DIG. 33; 179/178; 206/214, 215, 45.19, 45.34

[56] References Cited

U.S. PATENT DOCUMENTS

| | | | |
|---|---|---|---|
| 771,995 | 10/1904 | Myers | 312/231 |
| 1,055,146 | 3/1913 | de la Torre | 312/244 |
| 1,996,767 | 4/1935 | Hunter | 312/233 |
| 2,586,910 | 2/1952 | Bolle | 179/178 |
| 2,648,933 | 8/1953 | Brooks et al. | 312/231 |
| 3,084,473 | 4/1963 | Castro | 179/178 |
| 3,456,994 | 7/1969 | Sullivan | 312/184 |
| 3,546,396 | 12/1970 | Marcheschi | 179/178 |
| 3,967,869 | 7/1976 | Jackson | 312/DIG. 33 |
| 4,192,425 | 3/1980 | Landau et al. | 179/178 |
| 4,244,632 | 1/1981 | Molinari | 312/231 |

FOREIGN PATENT DOCUMENTS

| 1182637 | 6/1959 | France | 312/233 |
|---|---|---|---|
| 1125011 | 8/1968 | United Kingdom | 179/178 |

*Primary Examiner*—Victor N. Sakran
*Attorney, Agent, or Firm*—Sim & McBurney

[57] ABSTRACT

A telephone organizer comprises a box-like enclosure housing a telephone, and ancilliary items, such as, a telephone number note-book, a note-pad, a writing implement and a clock/timer. The enclosure is comprised of two hingedly connected parts.

4 Claims, 3 Drawing Figures

TELEPHONE ORGANIZER

FIELD OF INVENTION

The present invention relates to an organizer for a telephone and ancilliary items.

BACKGROUND TO THE INVENTION

The telephone is one of the most ubiquitous of instruments. Many people keep a personal telephone directory or roll card director for use in conjunction therewith and also keep a note-pad and writing implement adjacent the telephone to take notes and messages. There exists a need to collate these items into a single structure of neat appearance and compact form.

SUMMARY OF INVENTION

In accordance with the present invention, there is provided a telephone organizer comprising an openable housing wherein resides the telephone, and provision is made for locating within the enclosure at least one telephone ancilliary item, such as, a personal directory receiving holder telephone directory roll file or the like, a paper pad support, a writing implement holder, a clock and timing mechanism, and a telephone call recorder.

DESCRIPTION OF PREFERRED EMBODIMENT

Figure 1:
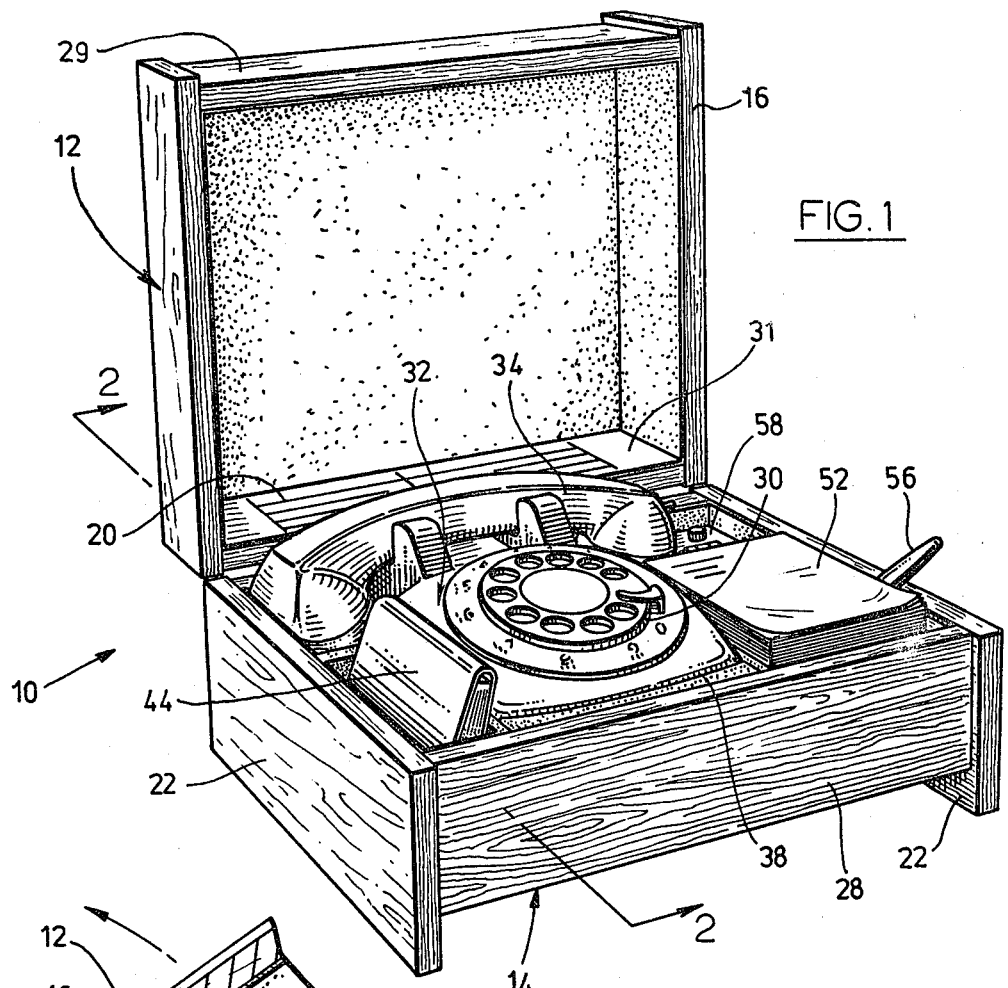
FIG. 1 is a perspective view of the telephone organizer of the invention with the housing or enclosure open.
Figure 2:
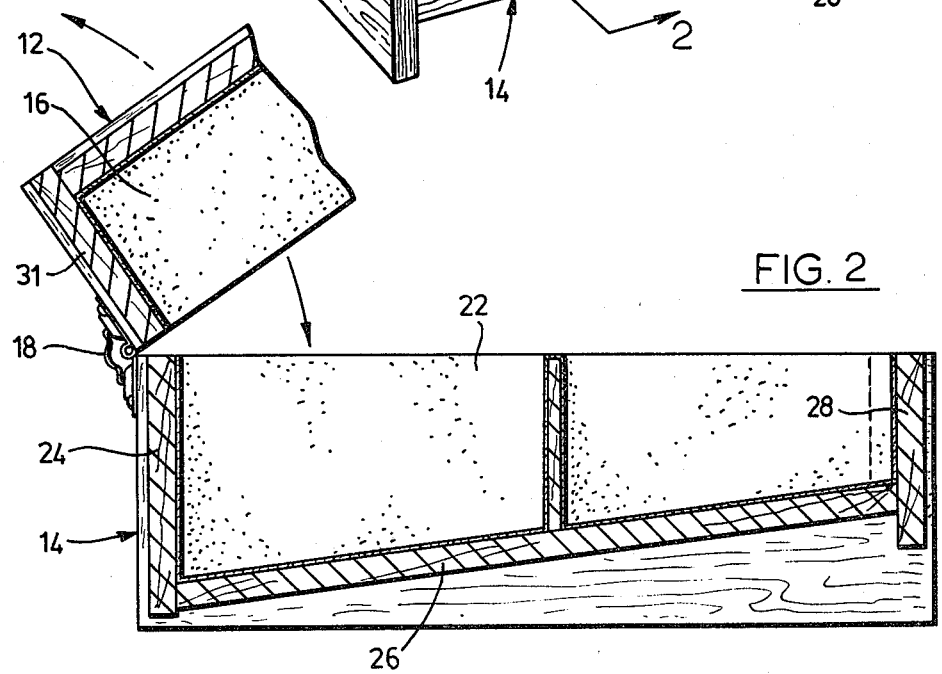
FIG. 2 is a sectional view taken on line 2—2 of FIG. 1.
Figure 3:
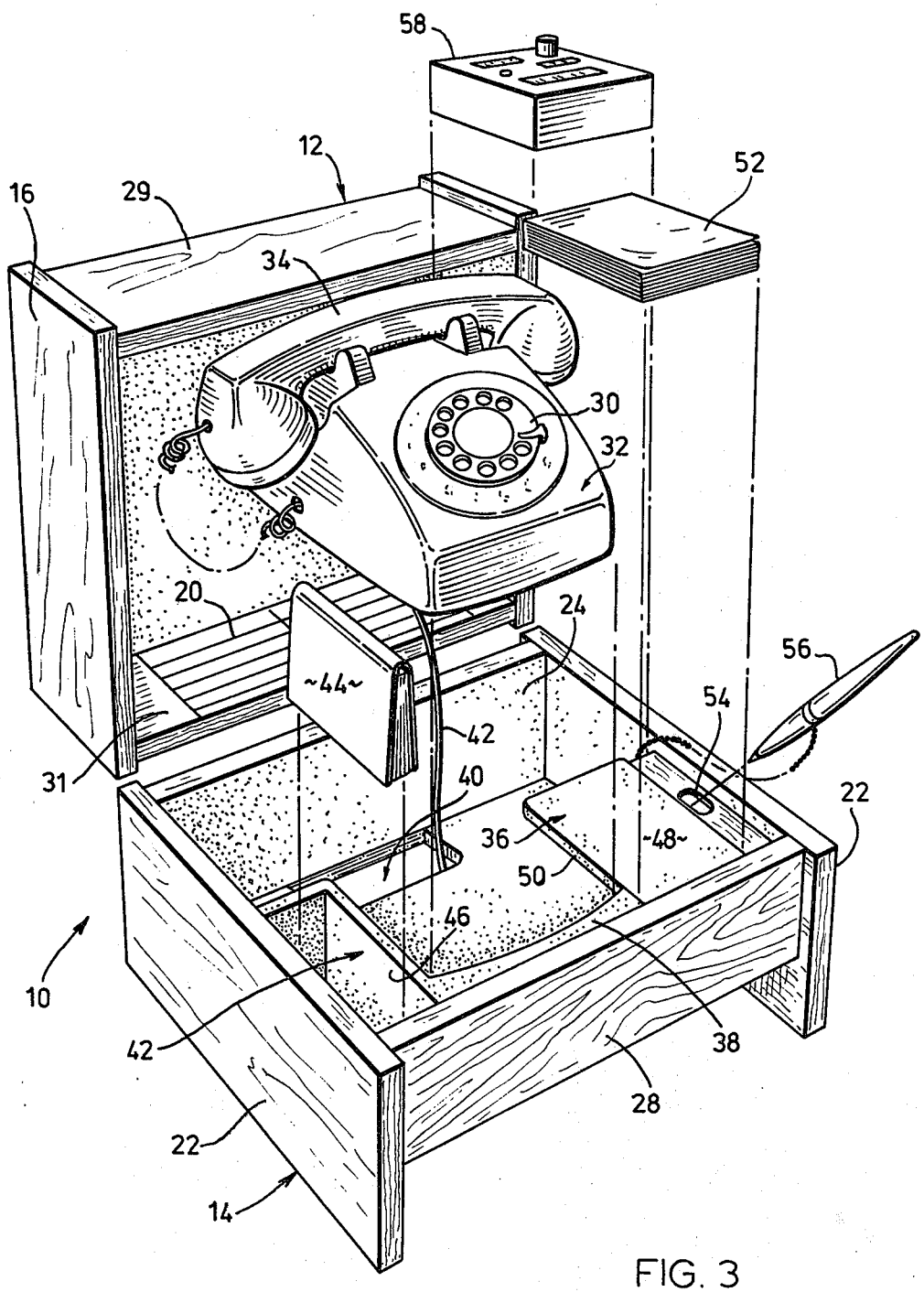
FIG. 3 is an exploded perspective view of the telephone organizer of FIG. 1.

Referring to the drawings, a telephone organizer 10 comprises an enclosure 12 having a lower item-receiving portion 14 and an upper portion 16 hinged thereto through hinges 18. The hinges 18 enable the enclosure 12 to be opened and access to the contents thereof to be gained by hinging action of the upper portion 16 relative to the lower portion 14. The hinges 18 are constructed to permit the upper portion 16 to be hinged open only to an upright position of the upper portion 16, as seen in FIG. 1.

The upper portion 16 may have a strip of paper 20 adhesively mounted to an inside surface thereof. The paper strip 20 may have emergency telephone numbers or other useful information applied thereto. Preferably, the paper strip 20 is applied, as seen in FIG. 1, to the inside surface of the upper portion 16 adjacent the hinges 18, so as to be prominently displayed when the enclosure is open.

The lower portion 14 has a generally rectangular side wall 22 and rear wall 24 which extend downwardly for the same distance, and a bottom wall 26 which slopes upwardly from the lower end of the rear wall 24 towards a generally rectangular front wall 28.

The front wall 28 is recessed slightly from the forward edge of the side walls 22 for aesthetic rather than functional reasons. The upper portion 16 includes a similarly-recessed front wall 29. The rear wall 24 of the lower portion 14 and the rear wall 31 of the upper portion 12 are similarly recessed with respect to the side walls 22. The front wall 28 depends to a location slightly below the bottom wall 26, although wall 28 may depend for the full height of the side walls 22, if desired.

The bottom wall 26 is sloped upwardly so as to compensate for the usual downward angle of the dial face 30 of a conventional dial telephone 32 received in the lower portion 14. The telephone 32 sits on the bottom wall 26 with its handset 34 extending longitudinally of the enclosure 12. The lower portion 14 is dimensioned so that the telephone 32 is snugly received between the front wall 28 and the rear wall 24 with the dial face 30 and handset 34 projecting above the vertical height of the lower portion 14 for ready access thereto when the enclosure 12 is opened.

The lower portion 14 also receives a molded piece 36 which includes a projection 38 which overlies the forward portion of the telephone 30 to position the telephone 30 against upward movement. An opening 40 is provided in the bottom wall 26 to permit a telephone cord 42 to connect the telephone 32 to a wall socket or the like. In addition, the opening 40 permits ventilation air to reach the telephone 32 and prevents undue muffling of the sound of the telephone bell when the telephone 32 rings. Furthermore, the opening 40 permits access to the bell loudness adjuster which is common on most telephones.

The molded piece 36 also includes portions which define a recess 42 wherein is received a personal telephone number book 44. The recess-defining portions of the molded piece 36 include a rearwardly-extending wall-forming portion 46 which engages one side of the telephone 32 to provide lateral stability thereto.

The molded piece 36 also includes a rearwardly-extending plate-like member 48 which has one side edge 50 engaging the opposite side of the telephone 32 from the side engaged by the wall 46. The plate 48 serves to support a note-pad 52 or the like within the enclosure 12.

An elongate bore 54 is provided in the molded part 48 to hold a pen 56 or other writing implement within the enclosure. While the molded part 48 is preferably formed as a one-piece element, separate elements may be used, if desired, to provide the functions described above.

A timing device 58, of any convenient construction, is provided to permit a telephone user to time the call that is being made. The timing device 58 may include a clock which indicates the time.

The telephone organizer 10, therefore, has a compact structure which enables a telephone 32, personal telephone number book 44, note-pad 52, pen 56 and timer 58 to be housed neatly within a single unit and normally out of visual sight. Access to the contents of the enclosure 12 when answering the telephone 32 or initiating a call is readily achieved by hinging open the upper portion 16.

The structure illustrated in the drawings represents one embodiment of the invention and modifications may be made thereto. The personal directory 44 may be replaced by a roll card director or other convenient directory means, with suitable modification to the housing to accommodate the same.

The telephone 32 may be of any other convenient form, such as, one having a touch-tone dialer, one having a hands-off "squalk box", a "Contempra" or "Princess" phone, etc. The enclosure may be suitably dimensioned to receive the telephone 32 which is adopted.

The enclosure also may be modified to accommodate a tape recorder which is hooked to the telephone to enable telephone calls to be recorded. The tape recorder may incorporate an answering system, if desired.

SUMMARY OF DISCLOSURE

In summary of this disclosure, the present invention provides a telephone organizer comprising an openable enclosure which houses, out of sight, a telephone, telephone directory, note-pad, writing implement, emergency numbers and other similar information and a timer/clock. Modifications are possible within the scope of this invention.

What I claim is:

1. A telephone organizer, comprising:

a box-like enclosure having a lower tray-like portion receiving a telephone therein and an upper lid-like portion hingedly mounted to said lower portion for opening said enclosure through hinge means which permits said upper portion to be hingedly moved between a first position wherein said upper and lower portions define said enclosure and a second position wherein said upper portion is perpendicular to said lower portion;

said lower portion having a bottom wall on which said telephone rests and which slopes upwardly from the rear wall to the front wall thereof, said bottom wall having an opening therethrough located adjacent the rear wall of the lower portion and coinciding with the telephone to permit a telephone connecting cable to extend into the enclosure and hook up with the telephone, the front wall of said lower portion extending downwardly a distance less than the vertical height of the side walls and terminating below the vertical position of the adjacent end of the rear wall;

means within said lower portion holding said telephone in a substantially fixed position therein, and means within said lower portion for locating at least one telephone ancillary item in said enclosure comprising means defining a recess for receiving a personal telephone directory, means defining a plate for receiving a note-pad thereon, and means defining a writing implement holder, said recess-defining means, said plate-defining means and said holder-defining means comprising a one-piece molded insert positioned in said lower portion.

2. The telephone organizer of claim 1 including means defining an indicia bearing strip mounted in said upper portion.

3. The telephone organizer of claim 2 wherein said indicia-bearing strip is mounted on the inner surface of the rear wall of the upper portion so as to be prominently visible when the enclosure is open.

4. The telephone organizer of claim 1 including means retaining a clock-timer mechanism in said lower portion.

* * * * *